United States Patent [19]
Yamazaki et al.

[11] Patent Number: 5,172,954
[45] Date of Patent: Dec. 22, 1992

[54] INTEGRAL AUTOMOBILE TRUNK LID AND AIR SPOILER

[75] Inventors: Yoshio Yamazaki, Mie; Yasuzi Ozaki, Aichi; Toshio Hayashi, Inazawa, all of Japan

[73] Assignee: Toyoda Gosei Co., Ltd., Nishikasugai, Japan

[21] Appl. No.: 803,731

[22] Filed: Dec. 9, 1991

Related U.S. Application Data

[63] Continuation of Ser. No. 651,463, Feb. 6, 1991, abandoned.

[30] Foreign Application Priority Data

Feb. 19, 1990 [JP] Japan ............................. 2-15441[U]

[51] Int. Cl.5 ............................................ B62D 37/02
[52] U.S. Cl. ................................. 296/180.1; 296/76; 296/901; 428/76
[58] Field of Search ...................... 296/180.1, 76, 901; 428/74, 76, 167

[56] References Cited

U.S. PATENT DOCUMENTS

| | | | |
|---|---|---|---|
| 4,585,683 | 4/1986 | Curnow | 428/76 |
| 4,634,167 | 1/1987 | Moriki et al. | 296/76 |
| 4,805,958 | 2/1989 | Nagata | 296/901 |
| 4,892,770 | 1/1990 | Labrie | 428/76 |
| 5,009,463 | 4/1991 | Saitoh et al. | 296/901 |

FOREIGN PATENT DOCUMENTS

| | | | |
|---|---|---|---|
| 1384992 | 1/1975 | United Kingdom | 296/180.1 |
| 2142287 | 1/1985 | United Kingdom | 296/180.1 |

Primary Examiner—Robert R. Song
Attorney, Agent, or Firm—Cushman, Darby & Cushman

[57] ABSTRACT

An automobile trunk lid having an air spoiler on its upper surface, both being made of a fiber-reinforced plastic and integrally molded in one piece. Since such a trunk lid with an integral air spoiler has no joint therebetween, it has an improved decorative effect and is free from the entry of dust and wax into a joint.

4 Claims, 2 Drawing Sheets

INTEGRAL AUTOMOBILE TRUNK LID AND AIR SPOILER

This is a continuation of application Ser. No. 07/651,643, filed on Feb. 6, 1991, which was abandoned upon the filing hereof.

FIELD OF THE INVENTION

The present invention relates to a trunk lid of an automobile, in particular, a synthetic-resin trunk lid having an air spoiler integrally molded on the upper surface thereof.

RELATED ART STATEMENT

An air spoiler is mounted on the trunk lid of an automobile in some cases, for example, for improving the aerodynamic characteristics of the automobile when running at high speed.

Such an air spoiler has heretofore been produced separately from the trunk lid and fixed on the trunk lid by bolting or with an adhesive.

OBJECT OF THE INVENTION

Air spoilers thus fixed on a trunk lid by bolting or with an adhesive, has disadvantages in that it requires parts for the fixing, the fixing process, and a large number of operations. Moreover, the fixing of an air spoiler by bolting or with an adhesive results in the unavoidable formation of a space between the bonded surfaces of the air spoiler and the trunk lid. The space deteriorates the aerodynamic characteristics when running at high speed, and dust, wax and the like enter the space.

The present invention eliminates those disadvantages and overcomes such problems. The invention provides a trunk lid having an air spoiler without a joint (a space) and which requires no parts for fixing and no fixing operations by integrally molding the trunk lid and the air spoiler.

SUMMARY OF THE INVENTION

For achieving the above object, the present invention provides a trunk lid having an air spoiler both of which are made of a fiber-reinforced plastic and in which the air spoiler is integrally molded on the upper surface of the trunk lid.

Preferably, the present invention provides such a trunk lid in which either a reinforcing material made of a rigid resin foam or a hollow body, or a reinforcing material obtained by enveloping a rigid resin foam or a hollow body in a fiber-reinforced plastic, is embedded in the air spoiler as an insert.

Furthermore, the present invention provides such a trunk lid which possesses improved stiffness and strength by embedding of a reinforcing material made of a rigid resin foam or a hollow body in the under surface of the trunk lid.

BRIEF DESCRIPTION OF THE DRAWINGS

The drawings show examples of the present invention.

DETAILED DESCRIPTION OF PREFERRED EMBODIMENTS

Examples of the present invention are explained below with reference to the drawings.

Figure 1:
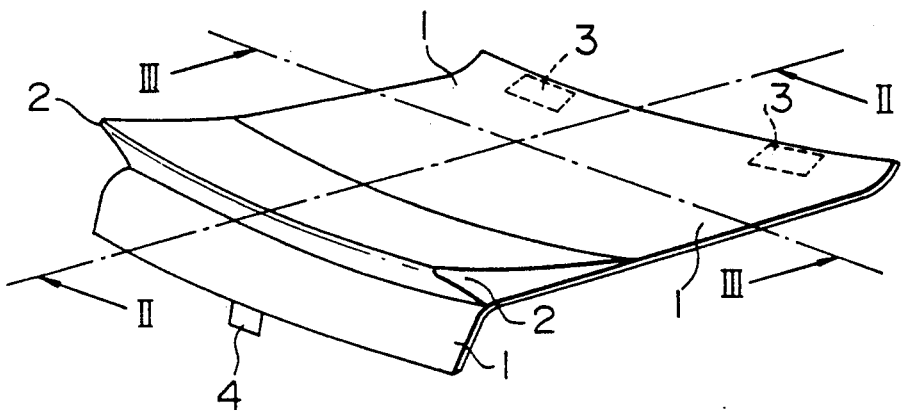
FIG. 1 is a perspective view of a trunk lid having an air spoiler in accordance with this invention.
Figure 2:
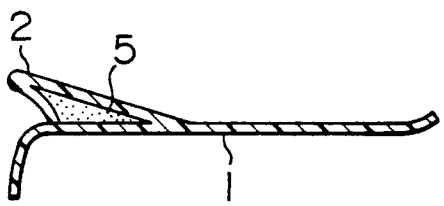
FIG. 2 is a cross-sectional view along line II—II in FIG. 1.
Figure 3:
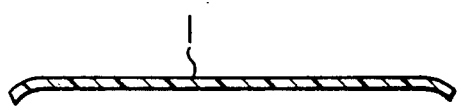
FIG. 3 is a cross-sectional view along line III—III in FIG. 1.
Figure 4:
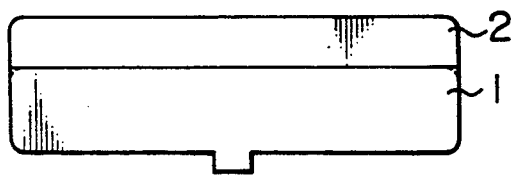
FIG. 4 is a front view of the trunk lid shown in FIG. 1.

Referring now to FIGS. 1-3, the trunk lid is made by molding a fiber-reinforced plastic into a lid 1, and an air spoiler 2 is integrally molded on the upper surface of the trunk lid. Hinge-attaching portions 3 are integrally molded on the hinging end of the trunk lid 1, and a hood portion 4 for latching on the other end of the trunk lid.

Reinforcing material 5 having a substantially triangular cross section is embedded in the air spoiler 2 by insert molding to a width substantially equal to the width of the air spoiler. The reinforcing material 5 is formed of a foam of a rigid resin, such as PUR, PS, PP or the like, is light weight, and has sufficient strength.

The trunk lid 1 and the air spoiler 2 are integrally molded out of a fiber-reinforced plastic by using the reinforcing material 5 as an insert. As a method for the molding, for example, the resin injection method (the RTM method) or the S-RIM method is suitable. In the RTM method, an unsaturated polyester and a vinyl monomer (a curing agent) are mixed in a static mixer and poured into a mold (not shown) of a predetermined shape containing glass fiber or the like. In the S-RIM method, an isocyanate and a polyol are brought together and mixed by means of a mixing head and poured into a mold containing glass fiber or the like. Examples of other synthetic resins to be poured are as follows. In the case of the RTM method, epoxy resins, vinyl ester resins, etc. can be used. In the case of the S-RIM method, urea resins, DCPD, etc. can be used.

Figure 5:
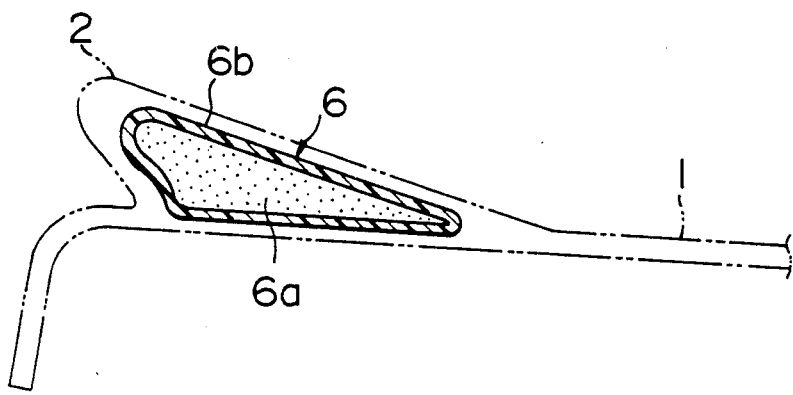
FIG. 5 is an enlarged fragmentary cross-sectional view of a reinforcing material for the air spoiler shown in FIG. 1.

FIG. 5 shows another example of reinforcing material embedded in the air spoiler 2. This reinforcing material 6 is formed by enveloping a rigid resin foam 6a molded in the manner described above, in a fiber-reinforced plastic 6b. By virtue of such envelopment of the rigid resin foam in the fiber-reinforced plastic, the reinforcing material 6 possesses further enhanced stiffness and strength.

The above reinforcing materials 5 and 6 can be formed by the use of a hollow body such as honeycomb or blow-molded article. In the case of the reinforcing material 6, when the hollow body is coated with a fiber-reinforced plastic, the product is light and has sufficient strength.

Figure 6:
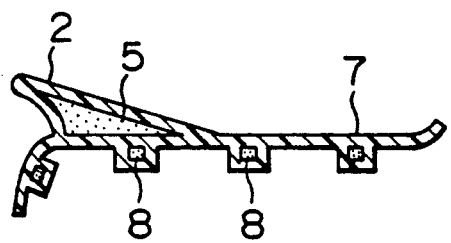
FIG. 6 is a cross-sectional view corresponding to FIG. 2 showing a modification of this invention.
Figure 7:
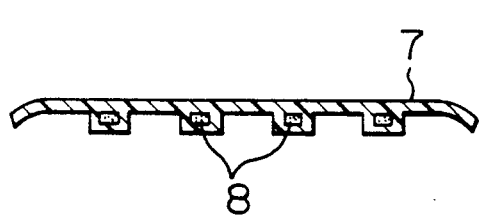
FIG. 7 is a cross-sectional view corresponding to FIG. 3 showing another modification of this invention.
Figure 8:
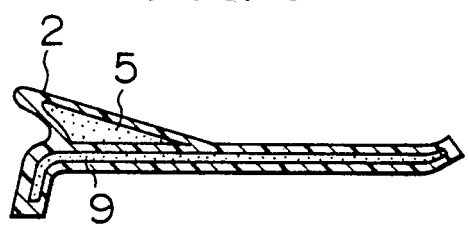
FIG. 8 is a cross-sectional view corresponding to FIG. 2 showing still another modification of this invention.
Figure 9:
FIG. 9 is a cross-sectional view corresponding to FIG. 3 showing a further modification of this invention.

FIGS. 6 to 9 show other examples or modifications of the present invention. FIGS. 6 and 7 show plural pieces of reinforcing rod-shaped material 8 embedded crosswise (FIG. 6) and lengthwise (FIG. 7) in a trunk lid 7 by insert molding. The rod-shaped material 8 is obtained by forming the same rigid resin foam or hollow body described above into a rod. In molding the trunk lid 7, the pieces of the rod-shaped material 8 are inserted into a mold as inserts and insert molding is carried out so as to embed them in projecting portions on the under surface of the trunk lid 7. As in the above, the trunk lid 7 is also molded out of a fiber-reinforced plastic containing glass fiber or the like. As shown in FIG. 8 and FIG. 9, it is also possible to insert a plate-shaped reinforcing material 9 into a trunk lid. The plate-shaped reinforcing material 9 is obtained by forming a rigid resin foam or a hollow body into a plate, and subjected to insert molding in the same manner as described above.

The stiffness and strength of the trunk lid can be further improved by thus embedding the rod-shaped reinforcing material 8 or the plate-shaped reinforcing material 9 of a rigid resin foam or a hollow body in the trunk lid by insert molding.

Figure 10:
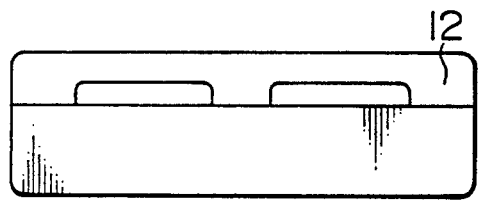
FIG. 10, FIG. 11 and FIG. 12 are front views of trunk lids having air spoilers of different configurations.
Figure 11:
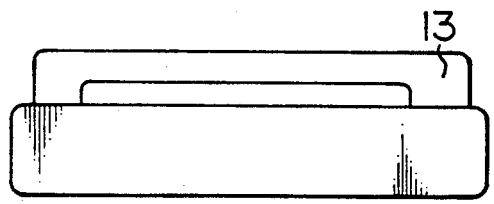
Figure 12:
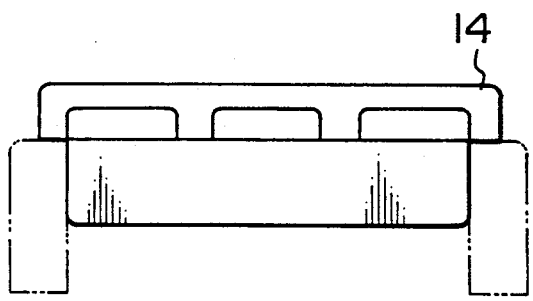

As to the shape of the connecting portion of the air spoiler to the trunk lid, the air spoiler may be integrally molded on the trunk lid through a plurality of legs, as shown in FIGS. 10 to 12. That is, on the trunk lid can be integrally molded an air spoiler 12 having three legs, as shown in FIG. 10, or an air spoiler 13 having two legs, as shown in FIG. 11, or an air spoiler 14 having four legs, as shown in FIG. 12.

As explained above, the trunk lid having an air spoiler of the present invention is made of a fiber-reinforced plastic, and the air spoiler is integrally molded on the upper surface of the trunk lid. Therefore, the number of parts for fixing and operations therefor can be reduced as compared with the case where, as in the past, an air spoiler and a trunk lid are separately produced and the air spoiler is fixed on the trunk lid by bolting or with an adhesive. Moreover, the trunk lid having an air spoiler of the present invention does not have a joint between the air spoiler and trunk lid, and therefore it is excellent in decorative effect and aerodynamic characteristics and can prevent dust and wax from entering, as before, the space in the joint.

Furthermore, the air spoiler can be given high stiffness and strength by embedding as an insert in the air spoiler either a reinforcing material made of a rigid resin foam or a hollow body, or a reinforcing material obtained by enveloping a rigid resin foam or a hollow body in a fiber-reinforced plastic.

In addition, it is also possible to improve the stiffness and strength of the trunk lid by embedding a rod-shaped or plate-shaped reinforcing material made of a rigid resin foam or a hollow body in the under surface of the trunk lid.

What is claimed is:

1. An automobile trunk lid having an air spoiler both made of fiber-reinforced plastic, the entire trunk lid and said spoiler being integrally molded in one piece, said air spoiler and said trunk lid each having a reinforcing material embedded therein, said reinforcing material being made of one of a rigid resin foam and a hollow body.

2. An automobile trunk lid having an air spoiler according to claim 1, wherein the reinforcing material embedded in said spoiler is enveloped in a fiber-reinforced plastic.

3. An automobile trunk lid having an air spoiler according to claim 1 wherein the reinforcing material embedded in said lid is rod shaped.

4. An automobile trunk lid having an air spoiler according to claim 1 wherein the reinforcing material embedded in said lid is plate-shaped.

* * * * *